Oct. 20, 1970  P. R. CHIRCO  3,534,580

ECCENTRIC RIVETING TOOL

Filed Sept. 30, 1968

INVENTOR.
Peter R. Chirco
BY
James, Dickey & Pierce
ATTORNEYS.

United States Patent Office 3,534,580
Patented Oct. 20, 1970

3,534,580
ECCENTRIC RIVETING TOOL
Peter R. Chirco, Utica, Mich., assignor to Huck Manufacturing Company, Detroit, Mich., a corporation of Michigan
Filed Sept. 30, 1968, Ser. No. 763,545
Int. Cl. B21d 9/05
U.S. Cl. 72—391                         6 Claims

ABSTRACT OF THE DISCLOSURE

A tool construction for setting fasteners including a reciprocable piston having an eccentric piston rod to provide clearance with the workpieces, with the piston rod extending both forwardly and rearwardly from the piston head and supported both forwardly and rearwardly whereby forces tending to cock the piston head as a result of the eccentric construction are reacted.

SUMMARY BACKGROUND OF THE INVENTION

The present invention relates to tools for setting fasteners and, more particularly, to a novel eccentric tool construction.

In prior tool constructions for setting two piece fasteners, including a pin and a collar such as the lock bolt, a reciprocable piston is utilized having a rod portion extending coaxially with the piston head with the fastener being set by an axial force applied between the pin and collar. With conventional tools having the piston head and rod in line the pin of the fastener is pulled with a force aligned with the axis of the piston and rod. In many applications it would be desirable to be able to set the fastener along a line offset from the axis of the piston head whereby the fastener could be located closer to the one extremity of the tool, hence permitting the tool to be used in closer clearance applications with the workpieces than a conventional in-line tool. However, it has been found that one difficulty in locating the piston rod off center relative to the piston head is that the forces on the piston head and rod are unbalanced and tend to cock or pivot the piston head within the cylinder resulting in wear and evenutally tool failure. It has been discovered that this problem can be alleviated by constructing the piston to have rod portions which extend both forwardly and rearwardly of the piston head and by supporting the piston at both rod portions. In this manner cocking of the piston head in the cylinder is minimized and a tool having adequate life can be provided. Therefore, it is an object of the present invention to provide an improved tool construction for setting fasteners.

It is another object of the present invention to provide an improved tool for setting fasteners having a reciproable piston with an eccentric piston rod portion.

It is another object of the present invention to provide a tool construction of the above type having rod portions extending forwardly and rearwardly from the piston head with both rod portions being supported to prevent cocking of the piston head in the cylinder.

Still further objects and advantages of the present invention will become more apparent from a consideration of the following detailed description taken in conjunction with the drawings in which.

Figure 1:
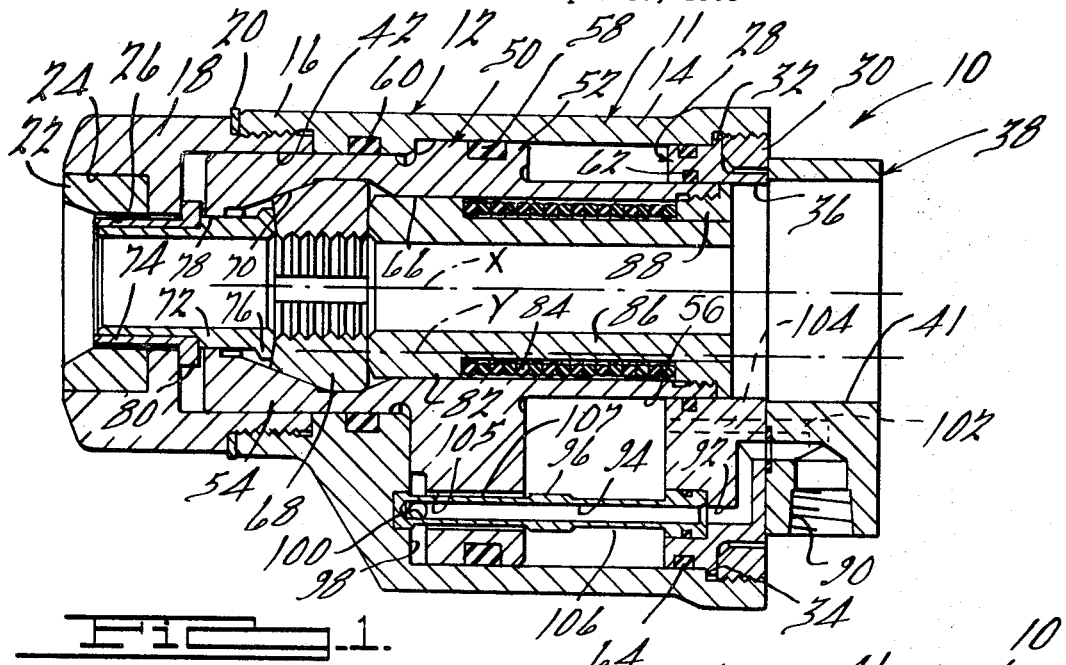
FIG. 1 is a longitudinal sectional view of the tool assembly embodying features of the present invention.
Figure 2:
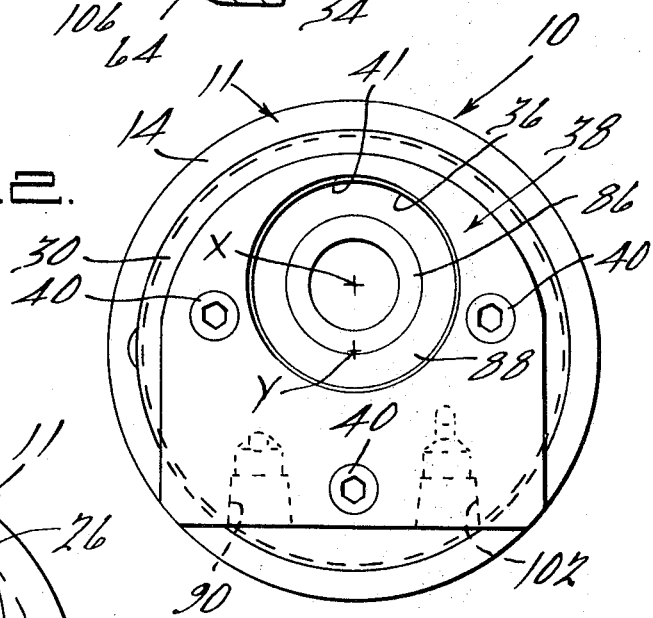
FIG. 2 is an end view of the assembly of FIG. 1.
Figure 3:
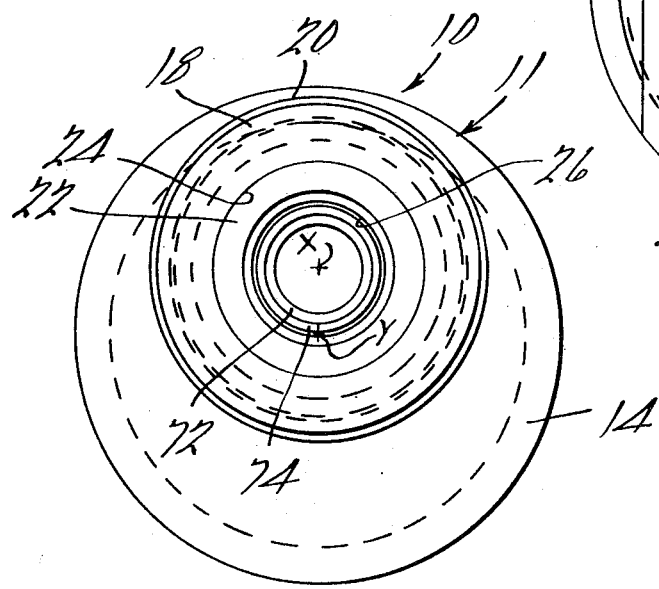
FIG. 3 is a front view of the assembly of FIG. 1.

Looking now to the drawings, a tool 10 includes a body assembly 11 in which a piston assembly 50 is reciprocably mounted. The body assembly 11 includes a hollow cylinder member 12 having an enlarged cylinder portion 14 and a reduced diameter nose portion 16. The axis X of the nose portion 16 is eccentric relative to the axis Y of the cylinder portion 14. An annular anvil holder 18 is threadably secured within the nose portion 16 and is held in place by a lock member 20; a swaging anvil member 22, of a construction known in the art, is located at the forward end of the holder 18 in the art, is located at the forward end of the holder 18 in a counterbore 24. The anvil 22 and the anvil holder 18 together define at the forward end of the tool 10, a reduced diameter opening 26. The rearward end of the cylinder member 12 has a generally circular cylinder head 28 located therein with the cylinder head 28 having a flange 32 engageable with a shoulder 34. The cylinder head 28 is held in place by a locking ring 30 which is threadably secured to the rearward end of the cylinder member 12 to hold flange 32 of the cylinder head 28 securely against the shoulder 34. The cylinder head 28 has a through bore 36 which has its axis in line with the axis X and hence is eccentric relative to the cylinder portion 14. An adapter member 38 is fixed to the cylinder head 28 by a plurality of fasteners 40. The adapter 38 has a bore 41 which is in line with the bore 36 of the cylinder head 28.

Thus in the construction described, the bores 36 and 41 communicate with the rearward end of the cylinder portion 14 along the axis X which is eccentric to the axis Y of the cylinder portion 14. The nose portion 16 and the anvil holder 18 define a reduced diameter bore 42 which is in communication with the forward end of the cylinder portion 14 and is eccentric thereto, i.e., along the axis X. The piston assembly 50 has a head portion 52 which is supported for reciprocation within the cylinder portion 14 and has a forward rod portion 54 which is eccentric to the head portion 52 and extends along the axis X and is slidably located within the defined bore 42. The piston 50 also has a rearward rod portion 56 which is also eccentric relative to the head portion 52 and extends along the axis X and is slidably supported within the bore 36.

Opposite sides of the head portion 52 are sealed by an annular seal 58 located in a peripheral groove in the head portion 52. The forward rod portion 54 is sealed by an annular seal 60 located in an annular groove in the bore portion 42 whereby the forward end of the rod portion 54 is sealed; the rearward rod portion 56 is sealed by an annular seal 62 which is engageable with the rearward rod portion 56 and is located in the bore 36 in the cylinder head 28. The outer periphery of the cylinder head 28 is sealed by an annular seal 64 located in a groove in the cylinder head 28 and engageable with the wall of the cylinder portion 14.

The piston assembly 50 has a through bore 66 which is eccentric with the head portion 52 and extends coaxially with the axis X. A plurality of chuck jaws 68, of known construction, are located in a frusto conically shaped forward portion 70 of the bore 66 and function in a manner known in the art to grip the pin of the fastener whereby a relative axial force can be applied between the pin and collar of the fastener whereby the fastener can be set. The chuck jaws 68 are normally maintained in an open position by means of a jaw release member 72. The jaw release member 72 is of a tubular construction and is located at the forward end of the frusto conical bore portion 70 and is connected with a tubular collar ejector member 74 which is located to extend in the bore 26 and partially into the anvil 22. The release member 72 and the ejector member 74 are connected together with the release member 72 having an annular shoulder 76 at its rearward end which is engageable with the jaws 68 whereby the jaws 68 can be moved to their radially outer or open position as shown. The shoulder 76 cooperates with the reduced diameter outer end 78 of the bore portion 70 to retain the release member 72 within the forward rod portion 54. The release member 74 has an annular shoulder 80 which is located adjacent the outer end of the forward rod portion 54. The shoulders 76 and 80 in release member 72 and ejector member 74, respectively, are located on opposite sides of the reduced diameter outer end 78 of the bore portion 78 to retain the release members 72 and ejector member 74 to the forward rod portion 54.

A tubular jaw follower member 82 is slidably located in the bore 66. The follower 82 has its forward end in engagement with the rearward end of the chuck jaws 68. A plurality of O-ring members 84 are located around a reduced diameter portion 86 of the follower 82 with the rearward end of the O-rings 84 engaging a retainer member 88, which is threadably engaged into the rearward end of the rearward rod portion 56 of the piston assembly 50. The O-ring members 84 urge the follower 82 against the chuck jaws 68 to urge the jaws 68 toward a closed position. The jaw follower 82 has its axis coaxial with the axis X and is slidable within the bore 66 and through the retainer 88.

The piston 50 is fluid actuated by fluid under pressure which can be introduced to the forward end of the piston head 52 via a fluid passage 90 in the adapter 38 which is in communication with a fluid passage 92 located in the cylinder head 28 which in turn is in communication with a through bore 94 through a longitudinally or axially extending rod 96. The rod 96 extends through a bore 105 through piston head 52 and defines a valve construction of the type shown and described in the patent to Peter R. Chirco, No. 3,362,211, issued Jan. 9, 1968, which patent is incorporated herein by reference. The rod 96 has one end fixed to the cylinder head 28 and has its opposite end fixed to the opposite end wall 98 of the cylinder portion 14. The bore 94 communicates with the forward end of the cylinder head 52 via a port 100. Thus fluid under pressure can be transmitted to the forward end of the head portion 52 via the passageways 90 and 92, via the bore 94 and the port 100 to move the piston assembly 50 in its rearward direction. With the piston 50 moving rearwardly, the jaw assembly 68 is moved radially inwardly to grip the pin of the fastener whereby a relative axial force can be applied between the pin and collar to set the fastener. As fluid pressure is applied to the forward side of the piston head 52, fluid is ejected from the opposite, rearward side via through passageways 102 and 104 which extend through the adapter 38 and cylinder head 28 respectively. To move the piston assembly 50 in the opposite direction after setting of the fastener, the fluid pressure is reversed such that the passageways 102 and 104 are pressurized to apply fluid pressure to the rearward side of the piston head 52 and fluid is transmitted out from the forward side of the cylinder head 52 via the port 100, bore 94 and passageways 92 and 90. With the piston 50 moving in its forward direction, the jaws 68 will engage the rearward end of the release member 72 to open the jaws 68 to release the pin. At the same time, the forward end of the rod portion 54 engages the shoulder 80 of the collar ejector 74 to move the ejector 74 against the swaged collar whereby the collar will be rejected from the anvil 22 to thereby completely release the tool 10 from the fastener. As shown in the above noted patent, the rod 96 at its outer surface is provided with reduced diameter portions 106 and 107 such that when the piston head 52 is located in its rearward or forward positions the bore 105 will be in line with one of the reduced diameter portions 106 or 107 whereby the fluid pressure will be relieved preventing excessive fluid pressure from damaging the tool.

Note that the forward rod portion 54 is slidably supported in bore 42 and the rearward rod portion 56 is slidably supported in the bore 36. Because of the eccentricity of the rod portions 54 and 56 relative to the head portion 52, the axial force applied along the offset axis X and the forces acting on the piston head portion 52 will tend to twist or cock the head portion 52 in the cylinder 14. By supporting the piston assembly 50 at both ends via the forward rod portion 54 and the rear rod portion 56, the forces tending to twist or cock the head portion 52 will be adequately reacted whereby this twisting or cocking will be minimized. In prior eccentric tool constructions in which the piston is supported only at one end, this twisting or cocking could result in excessive wear and eventual failure of the tool. In the present invention this is prevented by providing support at both the forward and rearward piston portions 54 and 56.

While it will be apparent that the preferred embodiment of the invention disclosed is well calculated to fulfill the objects above stated, it will be appreciated that the invention is susceptible to modification, variation and change without departing from the proper scope or fair meaning of the invention.

What is claimed is:

1. A tool for setting fasteners of the two piece type including a pin and a collar with the fastener being set by a relative axial force applied by the tool between the pin and the collar, said tool comprising: a housing assembly having a cylinder having one axis and having forward and rearward extending bores having another axis eccentric with said one axis, a piston having a head portion mounted for reciprocation in said cylinder and having forward and rearward rod portions connected with said head portion and located for reciprocation in said forward and rearward extending bores, respectively, and gripping means operatively connected with said forward rod portion for gripping the pin of the fastener.

2. The tool of claim 1 with said housing assembly including a cylinder portion having an enlarged diameter bore at its rearward end and a nose portion at its forward end, said nose portion defining at least a part of said forward bore.

3. The tool of claim 2 with said housing assembly including a cylinder head supported in said enlarged diameter bore and having a reduced diameter bore defining at least a part of said rearward bore.

4. The tool of claim 3 including first sealing means for providing a fluid seal between said nose portion and said forward rod portion, and second sealing means for providing a fluid seal between said enlarged diameter bore and said rearward rod portion.

5. The tool of claim 3 with said piston having a through bore, said through bore having a frusto conical portion located at said forward rod portion for receiving said gripping means.

6. The tool of claim 5 comprising a swaging anvil assembly supported by said nose portion for swaging the collar onto the pin, release means for releasing said gripping means from the pin when said piston is in its forward position, said release means supported by said forward rod portion, and collar ejector means supported by said forward rod portion for ejecting the collar from said anvil when said piston is moved to its forward position.

References Cited

UNITED STATES PATENTS

| 2,132,112 | 10/1938 | Huck | 72—391 |
| 3,362,211 | 1/1968 | Chirco | 72—391 |
| 3,446,509 | 5/1969 | Colosimo | 72—391 |

CHARLES W. LANHAM, Primary Examiner

G. P. CROSBY, Assistant Examiner

U.S. Cl. X.R.

72—453

PO-1050
(5/69)

UNITED STATES PATENT OFFICE
CERTIFICATE OF CORRECTION

Patent No. 3,534,580      Dated October 20, 1970

Inventor(s) Peter R. Chirco

It is certified that error appears in the above-identified patent and that said Letters Patent are hereby corrected as shown below:

Column 2, line 9 should be omitted entirely

Column 3, line 63, delete "rejected" and substitute therefor --ejected--

Signed and sealed this 20th day of April 1971.

(SEAL)
Attest:

EDWARD M. FLETCHER, JR.      WILLIAM E. SCHUYLER, JR.
Attesting Officer      Commissioner of Patents

PO-1050
(5/69)

UNITED STATES PATENT OFFICE
CERTIFICATE OF CORRECTION

Patent No. 3,534,580   Dated October 20, 1970

Inventor(s) Peter R. Chirco

It is certified that error appears in the above-identified patent and that said Letters Patent are hereby corrected as shown below:

Column 3, line 8, delete "78" and substitute therefor --70--

Signed and sealed this 3rd day of August 1971.

(SEAL)
Attest:

EDWARD M. FLETCHER, JR.
Attesting Officer

WILLIAM E. SCHUYLER, JR.
Commissioner of Patents